US006778964B2

(12) United States Patent
Geiger et al.

(10) Patent No.: US 6,778,964 B2
(45) Date of Patent: Aug. 17, 2004

(54) ELECTRICAL APPLIANCE VOICE INPUT UNIT AND METHOD WITH INTERFERENCE CORRECTION BASED ON OPERATIONAL STATUS OF NOISE SOURCE

(75) Inventors: Dieter Geiger, Kelheim (DE); Rainer Haberlander, Waging (DE); Uwe Has, Unterneukirchen-Oberschroffen (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 160 days.

(21) Appl. No.: 10/217,176

(22) Filed: Aug. 12, 2002

(65) Prior Publication Data

US 2003/0023448 A1 Jan. 30, 2003

Related U.S. Application Data

(63) Continuation of application No. PCT/EP01/01146, filed on Feb. 2, 2001.

(30) Foreign Application Priority Data

Feb. 11, 2000 (DE) .......................................... 100 06 240

(51) Int. Cl.[7] .............................................. G10L 15/20
(52) U.S. Cl. ...................................... 704/275; 704/270
(58) Field of Search ............................ 704/270.1, 275, 704/270; 364/188

(56) References Cited

U.S. PATENT DOCUMENTS

| 4,532,648 A |   | 7/1985  | Noso et al. |
|---|---|---|---|
| 4,916,439 A | * | 4/1990  | Estes et al. ................. 340/679 |
| 5,086,385 A | * | 2/1992  | Launey et al. ................ 700/83 |
| 5,590,206 A | * | 12/1996 | An et al. ................. 381/71.13 |
| 5,970,446 A |   | 10/1999 | Goldberg et al. |
| 6,119,088 A | * | 9/2000  | Ciluffo ........................ 704/275 |
| 6,219,645 B1 | * | 4/2001  | Byers ......................... 704/275 |
| 6,230,137 B1 |   | 5/2001  | Has et al. |
| 6,654,467 B1 | * | 11/2003 | York et al. ............... 381/71.14 |

FOREIGN PATENT DOCUMENTS

| DE | 40 22 511 A1   | 1/1992  |
|---|---|---|
| DE | 43 18 529 C2   | 12/1993 |
| DE | 196 37 352 A1  | 3/1998  |
| DE | 197 51 536 A1  | 8/1998  |
| DE | 197 12 632 A1  | 10/1998 |
| EP | 0 078 014 A1   | 5/1983  |
| JP | 58 160 736     | 9/1983  |
| WO | WO 98/55992    | 12/1998 |

OTHER PUBLICATIONS

John N. Holmes: "Sprachsynthese und Spracherkennung" [speech synthesis and recognition], R. Oldenbourg Verlag München, 1991, pp. 5–9, 44, and 45.

* cited by examiner

Primary Examiner—Tālivaldis Ivars Smits
Assistant Examiner—Jakieda Jackson
(74) Attorney, Agent, or Firm—Laurence A. Greenberg; Werner H. Stemer; Gregory L. Mayback

(57) ABSTRACT

Improving voice recognition when there exist interference noises in a configuration with an electrically operated appliance, a voice input unit, and a voice processing unit that derives control signals for controlling functions of the appliance from spoken input instructions includes an operating status detection unit detecting the operating status of the household appliance or other noise sources and signals such detection results to the voice processing unit, the voice processing unit performing an interference noise correction only if a noise source is switched on.

23 Claims, 2 Drawing Sheets

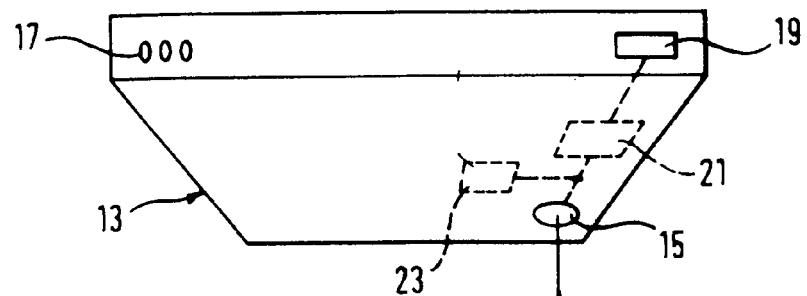
Fig. 1
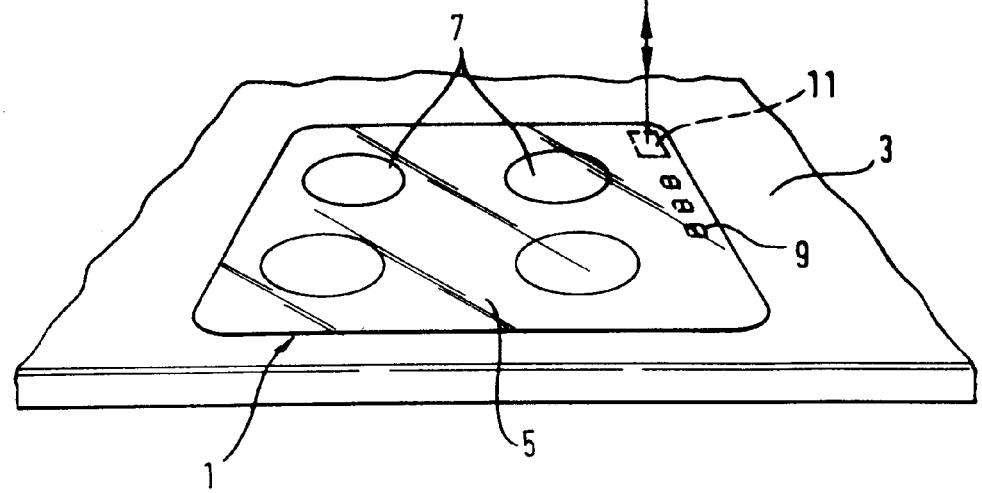
Fig. 2
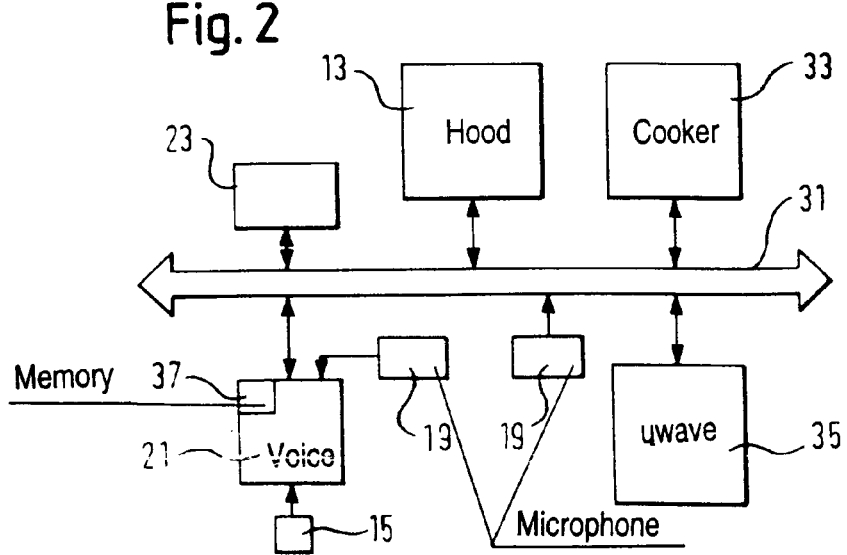

US 6,778,964 B2

ELECTRICAL APPLIANCE VOICE INPUT UNIT AND METHOD WITH INTERFERENCE CORRECTION BASED ON OPERATIONAL STATUS OF NOISE SOURCE

CROSS-REFERENCE TO RELATED APPLICATION

This application is a continuation of copending International Application No. PCT/EP01/01146, filed Feb. 2, 2001, which designated the United States and was not published in English.

BACKGROUND OF THE INVENTION

1. Field of the Invention

The present invention relates to a configuration with an electrically operated appliance with a voice input unit and with a voice processing unit that derives necessary control signals from spoken input instructions for controlling functions of the appliance, and a voice input method with correction of interference signals.

International Publication WO 98/55992, corresponding to U.S. Pat. No. 6,230,137 to Has et al., discloses a configuration and a method in which a household appliance is described that can be controlled by voice signals. To avoid malfunctions, for example, due to voice signals that do not originate from an operator but rather, for example, from a radio, the publication describes configuring a control program such that successive voice signals lead to the formation of a control instruction only if the successive voice signals are input within a predefinable time.

Furthermore, a product with the designation "SICARE pilot" (from evosoft Software-Vertrieb [sales] GmbH, D-90411 Nuremberg/Germany) is already in the REHA field and includes a mobile appliance that converts spoken instructions into signals. The signals are output by an infrared transmitter, for example, for controlling television appliances, video recorders, hi-fi equipment, telephone and lighting, by a radio transmitter, for example, for controlling house doors, wheelchairs, personal paging systems, and alarm systems or by wire-bound interfaces, for example, for controlling electrically driven wheelchairs and beds that can be adjusted by motor. The prior art product, which is intended for disabled people, permits a maximum of 64 instructions to be stored. The mobile appliance transmits the instruction for the desired action, for example, "television on," to the respective appliance automatically through the previously selected interface. Each individual instruction can address a plurality of appliances simultaneously. The prior art product is trained to the individual voice pattern of a person and, thus, carries out speech recognition on a speaker-dependent basis. In an ideal case, other persons are not able to form signals that control the appliance from spoken instructions.

Such voice recognition is implemented in the prior art product such that predefined words (for example "house," "light," "four," or "minus") can be spoken in accordance with a menu tree with a plurality of branches, it being possible to speak the individual words at any desired intervals. If the voice input is prematurely aborted as a result of an indisposition of the disabled person, individual words, for example, from a radio or television, which are provided in the branch of the menu tree after the point at which the voice input was aborted may lead to the formation of signals that control one or more appliances.

Furthermore, German Published, Non-Prosecuted Patent Application DE 196 37 352 A1 discloses a method for automatic voice recognition, reference utterances being firstly recorded for different words and then sequences of chronologically successive reference feature vectors being formed from them, which vectors are each mapped onto a uniform chronological interval. A single model of the reference utterances, whose components are composed of compensation functions, is formed for each word from the sequences of model vectors that are produced here for the reference utterances. A word that is to be recognized is processed to form a sequence of feature vectors that are each mapped onto the same chronological interval. The resulting sequence of mapping vectors is compared with the stored models in comparison steps.

Furthermore, the manual "Sprachsynthese und Spracherkennung [speech synthesis and speech recognition]", J. N. Holmes, R. Oldenbourg-Verlag, Munich, Vienna 1991, generally discloses that some information items relating to the phonetic content of the speech signal can be derived from the chronological profile of the speech signal. However, experience has shown that the time signal is not suitable for representing the properties of spoken language that are most important for general voice quality and perception of phonetic details. In view of the significance of the resonances and their chronological changes during verbal communication, a method for representing these features is necessary. The short-term spectrum of the signal that corresponds to the absolute value of the Fourier transformation of the time signal after it has been multiplied by a time window function with an appropriate duration may, of course, not contain any information that is not also contained in the original signal. However, it is also significantly more suitable for representation of the resonances and, in particular, for the computer-supported signal processing.

SUMMARY OF THE INVENTION

It is accordingly an object of the invention to provide an electrical appliance with voice input unit and voice input method that overcome the hereinafore-mentioned disadvantages of the heretofore-known devices and methods of this general type and that improves speech recognition despite the presence of interference noises.

With the foregoing and other objects in view, there is provided, in accordance with the invention, a configuration having an electrically operated household appliance, a voice input unit, and a voice processing unit deriving control signals from spoken input instructions for controlling functions of the household appliance, including an operating status detection unit to be connected to the household appliance and the voice processing unit, the operating status detection unit adapted to detect an operating status of at least one of the household appliance and other noise sources, to signal the operating status of the at least one of the household appliance and other noise sources to the voice processing unit, and to control the voice processing unit to perform an interference noise correction only if at least one of the noise sources is on.

With the objects of the invention in view, there is also provided a method for inputting voice signals with correction of interference signals, including the steps of interrogating an operating status of at least one noise source interfering with voice input during voice input for controlling a household appliance and performing an interference noise correction with a voice processing unit only if a noise source is on.

The invention provides an operating status detection unit that detects the operating status of the household appliance or of other noise sources and signals it to the voice processing unit, and that the voice processing unit performs an interference noise correction only if a noise source is switched on. The method according to the invention for voice input with correction of interference signals is characterized in that the operating status of at least one noise source that interferes with the voice input is interrogated during the voice input for controlling an appliance, and the voice processing unit performs an interference noise correction only if a noise source is switched on. According to the invention, therefore, when a voice signal for detection is submitted to the voice processing unit, an interference noise correction is not attempted in every case. Such a process leads to an improvement in the voice recognition in all the cases in which the voice signal is not at all subjected to interference noises. This is because the attempt to remove a nonexistent interference noise from the voice signal, or to include it in a correcting fashion, reduces the quality of the voice signal. This causes the recognition rate of the voice processing unit or voice recognition unit in the prior art to drop.

In accordance with another feature of the invention, the voice processing unit includes the interference signal of the noise source in a correcting fashion in the processing of the spoken input instructions, as a function of the respective operating status of the noise source.

For such a purpose, in accordance with a further feature of the invention, the configuration has a storage unit that is connected to the voice processing unit, and a data record that corresponds to the interference signal is stored in the storage unit for each operating status for each noise source. In a learning phase, which is carried out by the manufacturer in the laboratory or only by the end customer on the complete system that is installed in the house or in the kitchen, interference noise sources are operated in various operating modes. The respective interference noise is processed by the voice processing unit and, for example, a corresponding interference noise spectrum is stored in the storage unit as an operating-status-specific interference signal. During the actual operation of an electrical appliance according to the invention, in particular, of a household appliance in the kitchen, it is initially checked, during the voice input for controlling the appliance, whether or not interference sources analyzed in the learning phase are operating. If the sources are not operating, the voice instruction that is input is processed without noise source correction. However, if an interfering appliance is active, its operating status is detected and an interference noise data record that corresponds to the operating status is included in the signal processing or voice recognition in a correcting fashion. The voice signal that is corrected in terms of the interference noise is processed according to the prior art. The invention makes use of the fact that the number of interference sources and their typical interference noises are both limited and known in some application cases. An interference noise correction, therefore, does not need to be carried out with general correction approaches but rather it is possible for the known interference noises to be included in a correcting fashion as an alternative or an addition.

To increase the variability and application capability of the configuration according to the invention, in accordance with an added feature of the invention, on one hand, the operating status detection unit is connected to the noise source through an electrical line or through a wire free communications line, and, on the other hand, the configuration has a plurality of voice input units that are disposed spatially distributed, for example, in the kitchen or in a house.

Particularly reliable voice recognition can be implemented if the appliances that are controlled by voice input are at least a cooking surface and an extractor hood disposed over it, and the extractor hood with its various power settings is included as an interference source.

In accordance with an additional feature of the invention, the voice input unit, the voice processing unit, and the operating status detection unit are disposed in an appliance that is controlled by voice input, in particular, in the extractor hood. Under favorable thermal conditions, there is sufficient space in the extractor hood to hold the aforesaid components. Furthermore, a microphone can be disposed approximately at the level of the head of an operating person standing in front of the cooking surface that is disposed underneath the extractor hood. The microphone can have a corresponding directional characteristic to ensure that it is not subject to too high a level of interference from the extractor hood.

In accordance with yet another feature of the invention, the operating status detection unit is adapted to control the voice processing unit to perform an interference noise correction only if at least one of the noise sources is switched on.

In accordance with yet a further mode of the invention, the interference noise correction step is performed with the voice processing unit only if a noise source is switched on.

In accordance with yet an added mode of the invention, each operating status of the at least one noise source is assigned an interference noise stored as data material, the interference noise data material being included in a correcting fashion in processing of a spoken input instruction, dependent upon a currently present operating status of the at least one noise source.

In accordance with a concomitant mode of the invention, interference noises are stored as data material, each operating status of the at least one noise source is assigned a respective one of the interference noises, and a spoken input instruction is processed by correcting the spoken input instruction with the respective interference noise data material dependent upon a currently present operating status of the at least one noise source.

Other features that are considered as characteristic for the invention are set forth in the appended claims.

Although the invention is illustrated and described herein as embodied in an electrical appliance with voice input unit and voice input method, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a fragmentary, perspective view of a first exemplary embodiment of a configuration according to the invention;

FIG. 2 is a highly simplified block circuit diagram of significant components of a second exemplary embodiment of the configuration according to the invention;

DESCRIPTION OF THE PREFERRED EMBODIMENTS

Figure 3:
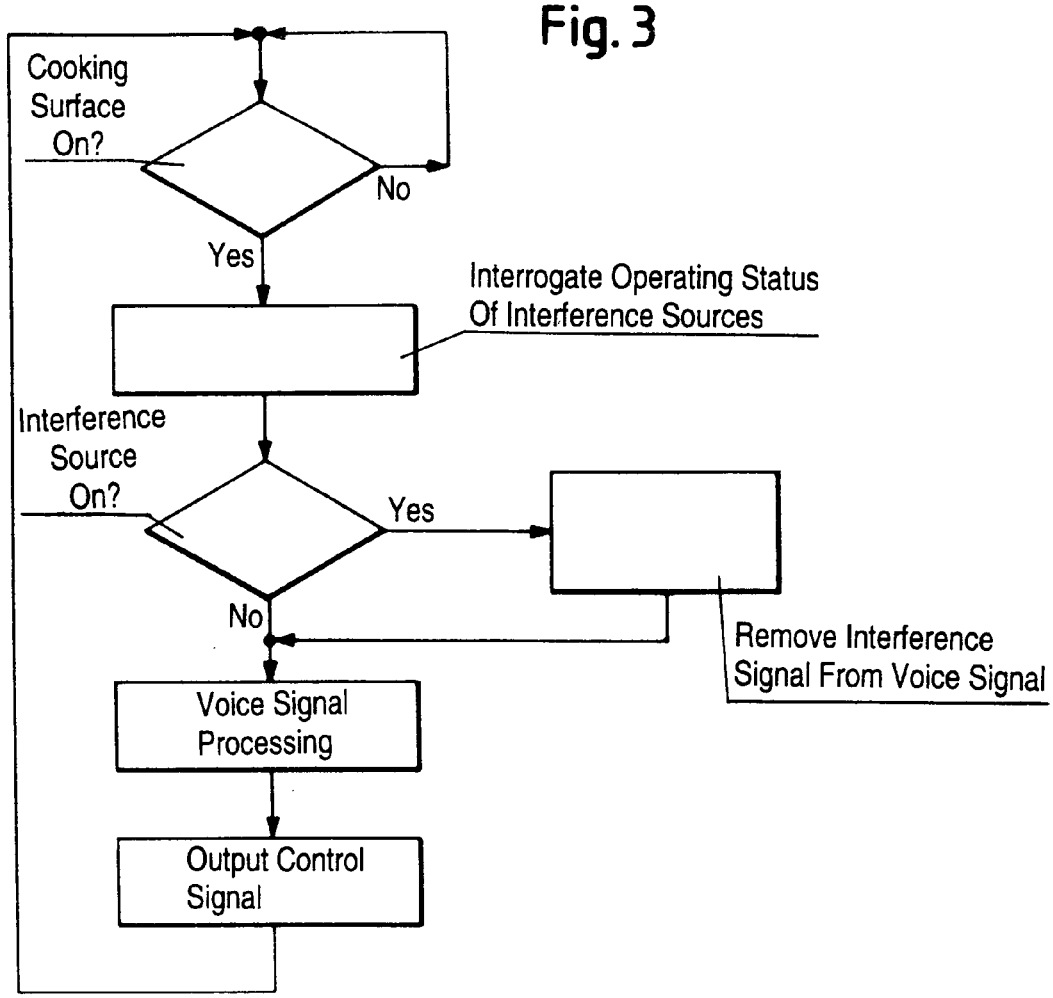
FIG. 3 is a flow chart of voice signal detection according to the invention.

Referring now to the figures of the drawings in detail and first, particularly to FIG. 1 thereof, there is shown the first exemplary embodiment of the configuration, which has a cooking surface 1 that is mounted in a detail of an operating plate 3. Various cooking zones 7 are marked on a cooking plate 5, which is, in particular, made of glass ceramic. Depending on the inputs through an operator and display unit 9 of the cooking surface 1, non-illustrated cooking vessels that are placed on the cooking zones 7 can be heated in a conventional manner by non-illustrated heating elements that are disposed underneath the cooking plate, through a control unit. Here, the operating and display unit 9 may be present for reasons of comfort and safety. However, it may also be reduced to a minimum that is prescribed for safety equipment, as the overall configuration also has a voice input unit as described below. In the cooking surface 1 there is also a transceiver unit 11 that can communicate in a conventional manner through a wire free transmission link Ü with an extractor hood 13 that is disposed above the cooking surface 1. The transmission link can be implemented, for example, as a radio link. To communicate with the cooking surface 1, the extractor hood 13 also has a suitable transceiver unit 15. Furthermore, the extractor hood 13 can have operating and display elements 17 corresponding to the cooking surface. To permit a voice input, a suitable microphone 19 is installed in the extractor hood 13. The microphone 19 is connected to an electronic voice processing system 21 that is, at the same time, also connected to the transceiver unit 15. An operating status detection unit 23 is connected to the transceiver unit 15 and/or the electronic voice processing system 21.

Figure 4:
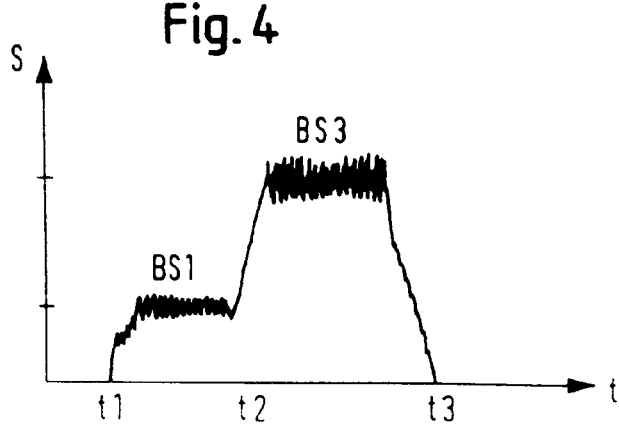
FIG. 4 is a graph indicating a time profile of an interference signal during different operating states.

The basic method of operation of the configuration shown in FIG. 1 is described in the following text, and with reference to FIGS. 3 and 4.

To switch on the cooking surface, an operator approaches the cooking surface 1 and speaks the instruction "cooking surface on," for example, into the activated microphone 19. The operating status detection unit 23 signals, at the same time, to the electronic voice processing system 21 whether or not the extractor hood 13 is running, and, thus, causing an interference noise (S) or not. If the extractor hood 13 is not running, the spoken instruction is processed in the electronic voice processing system 21 without noise source correction, the instruction is recognized, and the cooking surface is switched on through the transmission link Ü. If the operator then inputs further speech instructions to work with the cooking surface 1, for example, "cooking area 3, level 9," it is checked in each case whether or not the extractor hood 13 is running. The extractor hood 13 can be started automatically whenever the cooking surface 1 is switched on. However, the hood 13 may also be started only when a corresponding start instruction is spoken into the microphone 19 by the operator. Thus, when an instruction to change the operating state of the cooking surface 1 is spoken into the microphone 19 while the extractor hood 13 is operating, the operating status detection unit 23 determines the present operating status (BS) of the extractor hood 13. For example, each blower setting (BS1, BS2, . . . ) of the hood 13 is assigned a specific interference signal (S1, S2, . . . ) as a data record. The unit 23 conducts the interference noise data material associated with the respective operating status of the noise source or of the extractor hood 13 to the electronic voice processing system 21 that, then, firstly removes the interference component from the spoken cooking surface instruction in a first signal processing step, and, then, further processes the remaining, preprocessed voice signal in a second signal processing step. In contrast, when there is no interference noise, according to the invention, the first signal processing step is dispensed with. The sequence of the voice signal processing and the time profile of an interference signal (S) are illustrated in highly simplified form for various operating states (BS1, BS3) in FIGS. 3 and 4.

According to the second exemplary embodiment according to FIG. 2, the various household appliances are connected to a household appliance bus 31. Here, the overall configuration is formed by a cooker 33, an extractor hood 13 that is disposed over the cooker 33, and a microwave appliance 35 that are installed together in a kitchen. Furthermore, the electronic voice processing system 21 is connected to the household appliance bus 31, it being possible to provide the electronics 21 at any desired location in the house. Furthermore, various microphones 19 are provided that can be connected both directly to the electronic voice processing system 21 and to the household appliance bus 31. FIG. 2 shows that the electronic voice processing system 21 has an interference noise memory 37 in which a corresponding interference signal (S1 S2, . . . ) is stored as a data is stored for each operating status (BS1, BS2, . . . ) for each appliance that can function as an interference source. Typically, in the configuration shown and the method described above, the ventilation noises of the extractor hood 13 or the fan noises and humming noises of the transformer of the microwave appliance 35 can be corrected in the voice input to control the cooker 33, the extractor hood 13, or the microwave appliance 35.

We claim:

1. A configuration having an electrically operated household appliance, a voice input unit, and a voice processing unit deriving control signals from spoken input instructions for controlling functions of the household appliance, comprising:

an operating status detection unit to be connected to the household appliance and the voice processing unit, said operating status detection unit adapted to:
detect an operating status of at least one of the household appliance and other noise sources;
signal the operating status of the at least one of the household appliance and other noise sources to the voice processing unit; and
control the voice processing unit to perform an interference noise correction only if at least one of the noise sources is on.

2. The configuration according to claim 1, wherein the voice processing unit corrects the at least one interference signal of the at least one noise source in processing of spoken input instructions as a function of a respective operating status of the at least one noise source.

3. The configuration according to claim 1, including a storage unit to be connected to the voice processing unit, said storage unit storing a data record corresponding to a respective interference signal for each operating status of each noise source.

4. The configuration according to claim 1, wherein said operating status detection unit is to be connected to the noise source through at least one of an electrical line and a wireless communications line.

5. The configuration according to claim 1, wherein:
the household appliance controlled by voice input is a cooking surface; and
the other noise sources include an extractor hood disposed over the cooking surface.

6. The configuration according to claim 1, wherein the voice input unit is a plurality of voice input units.

7. The configuration according to claim 1, wherein:
the household appliance controlled by voice input is at least one of a cooking surface and an extractor hood disposed over the cooking surface; and
the other noise sources include the extractor hood.

8. The configuration according to claim 1, wherein the voice input unit, the voice processing unit, and said operating status detection unit are disposed in the household appliance.

9. The configuration according to claim 1, wherein the voice input unit, the voice processing unit, and said operating status detection unit are disposed in an extractor hood.

10. The configuration according to claim 1, wherein said operating status detection unit adapted to control the voice processing unit to perform an interference noise correction only if at least one of the noise sources is switched on.

11. In a system including an electrically operated household appliance, a voice input unit, and a voice processing unit deriving control signals from spoken input instructions for controlling functions of the household appliance, a controller comprising:
an operating status detection unit connected to said household appliance and said voice processing unit, said operating status detection unit detecting an operating status of at least one of said household appliance and other noise sources, signaling said operating status of said at least one of said household appliance and the other noise sources to said voice processing unit, and controlling said voice processing unit to perform an interference noise correction only if at least one of the noise sources is on.

12. The configuration according to claim 11, wherein said voice processing unit corrects an at least one interference signal of at least one of the noise sources in processing of spoken input instructions as a function of a respective operating status of the at least one of the noise sources.

13. The configuration according to claim 11, including a storage unit connected to said voice processing unit, said storage unit storing a data record corresponding to a respective interference signal for each operating status of each of the noise sources.

14. The configuration according to claim 11, wherein said operating status detection unit is connected to at least one of the noise sources through at least one of an electrical line and a wireless communications line.

15. The configuration according to claim 11, wherein:
said household appliance controlled by voice input is a cooking surface; and
the other noise sources include an extractor hood disposed over said cooking surface.

16. The configuration according to claim 11, wherein:
said household appliance controlled by voice input is at least one of a cooking surface and an extractor hood disposed over said cooking surface; and
the other noise sources include the extractor hood.

17. The configuration according to claim 11, wherein said voice input unit is a plurality of voice input units connected to said voice processing unit.

18. The configuration according to claim 11, wherein said voice input unit, said voice processing unit, and said operating status detection unit are disposed in said household appliance.

19. The configuration according to claim 11, wherein said voice input unit, said voice processing unit, and said operating status detection unit are disposed in an extractor hood.

20. A method for inputting voice signals with correction of interference signals, which comprises:
interrogating an operating status of at least one noise source interfering with voice input during voice input for controlling a household appliance; and
performing an interference noise correction with a voice processing unit only if a noise source is on.

21. The method according to claim 20, which further comprises performing the interference noise correction step with the voice processing unit only if a noise source is switched on.

22. The method according to claim 20, which further comprises assigning each operating status of the at least one noise source an interference noise stored as data material, the interference noise data material being included in a correcting fashion in processing of a spoken input instruction, dependent upon a currently present operating status of the at least one noise source.

23. The method according to claim 20, which further comprises:
storing interference noises as data material;
assigning each operating status of the at least one noise source a respective one of the interference noises; and
processing a spoken input instruction by correcting the spoken input instruction with the respective interference noise data material dependent upon a currently present operating status of the at least one noise source.

* * * * *